United States Patent [19]
Nilsson

[11] 3,837,446
[45] Sept. 24, 1974

[54] BRAKE OPERATING MECHANISMS

[75] Inventor: Rune Nilsson, Lindesberg, Sweden

[73] Assignee: AB Linde International, Lindesberg, Sweden

[22] Filed: Mar. 16, 1973

[21] Appl. No.: 341,943

[30] Foreign Application Priority Data
Mar. 22, 1972 Sweden............................ 3657/72

[52] U.S. Cl............................ 188/329, 188/106 A
[51] Int. Cl............................................ F16d 51/22
[58] Field of Search .......... 188/329, 330, 332, 338, 188/106 A, 106 P; 192/78

[56] References Cited
UNITED STATES PATENTS
| | | | |
|---|---|---|---|
| 1,878,911 | 9/1932 | Stoner | 188/329 |
| 2,024,847 | 12/1935 | Chambers | 188/106 A X |
| 2,082,021 | 6/1937 | Muenz | 188/332 |

FOREIGN PATENTS OR APPLICATIONS
| | | | |
|---|---|---|---|
| 805,603 | 5/1951 | Germany | 188/329 |
| 1,146,383 | 3/1963 | Germany | 188/332 |

*Primary Examiner*—Duane A. Reger
*Attorney, Agent, or Firm*—Karl W. Flocks

[57] ABSTRACT

An operating mechanism for a simplex type drum brake in which a pair of brake shoes are applied with their one ends against a stationary abutment and with their other ends against an expanding means. The expanding means is a rotatable body formed with an annular groove, and one portion of the groove bottom is eccentrically localized and forms an abutment surface for one brake shoe which has an abruptly cut transverse end surface, while the remaining groove bottom is arcuate and serves as an abutment surface for the other brake shoe, the end of which has an arcuate recess. The flanks of the groove are adapted to form lateral supports for the two brake shoe ends penetrating into the groove.

3 Claims, 12 Drawing Figures

PATENTED SEP 24 1974　　　　　　　　　3,837,446
SHEET 1 OF 4
FIG.2　　FIG.1
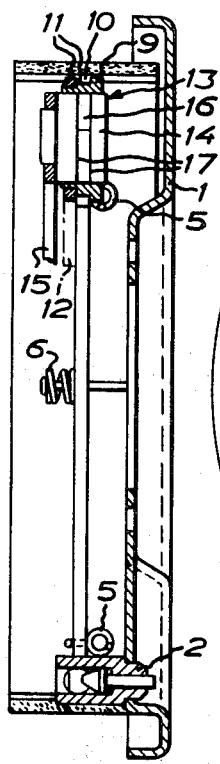
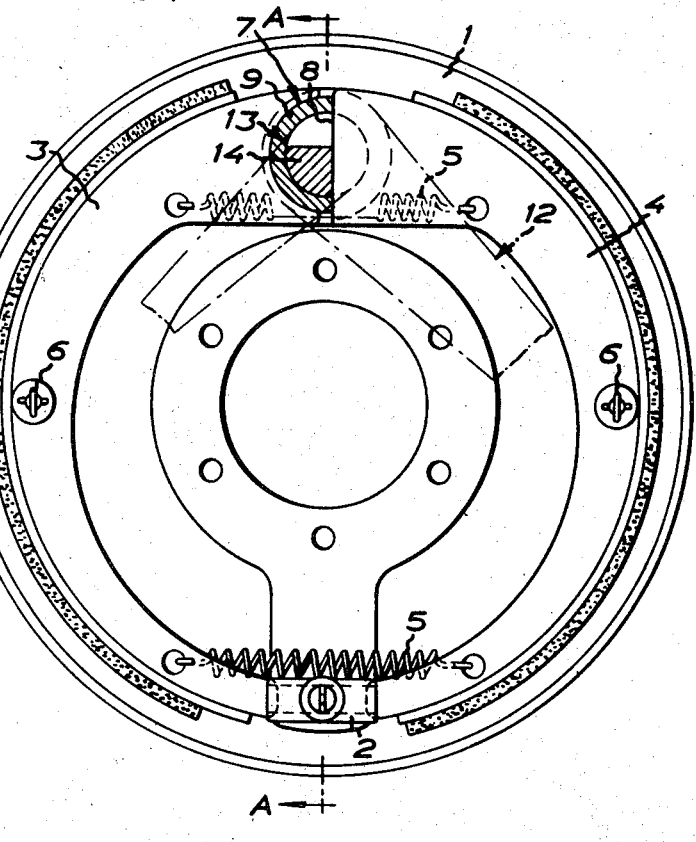
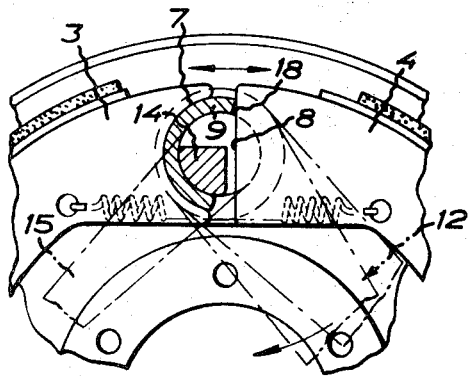
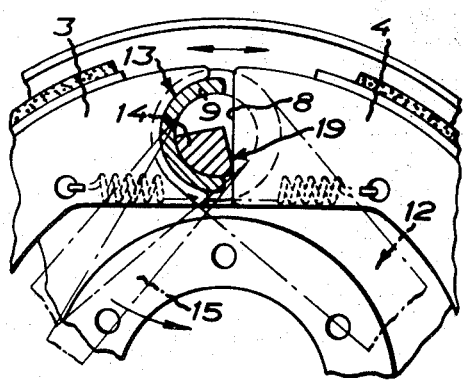
FIG.3　　FIG.4

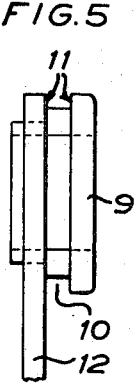
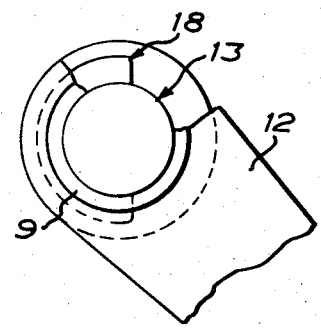
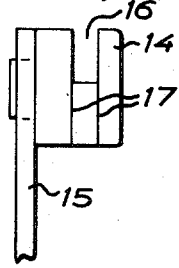
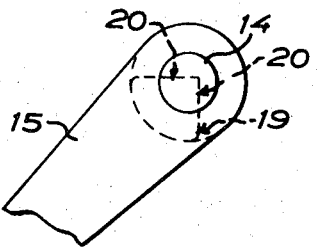
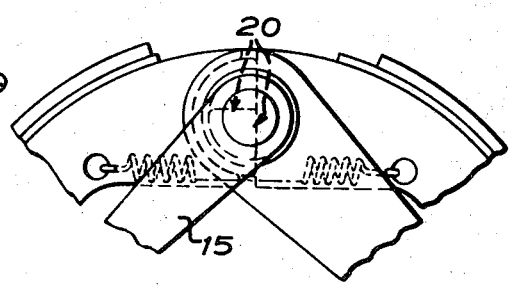
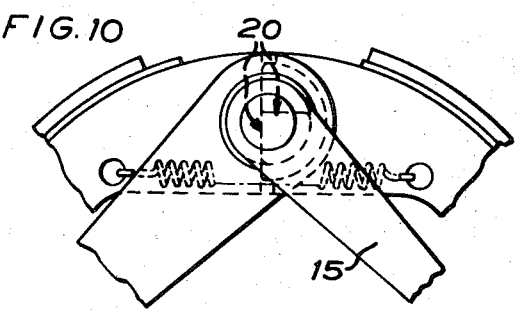

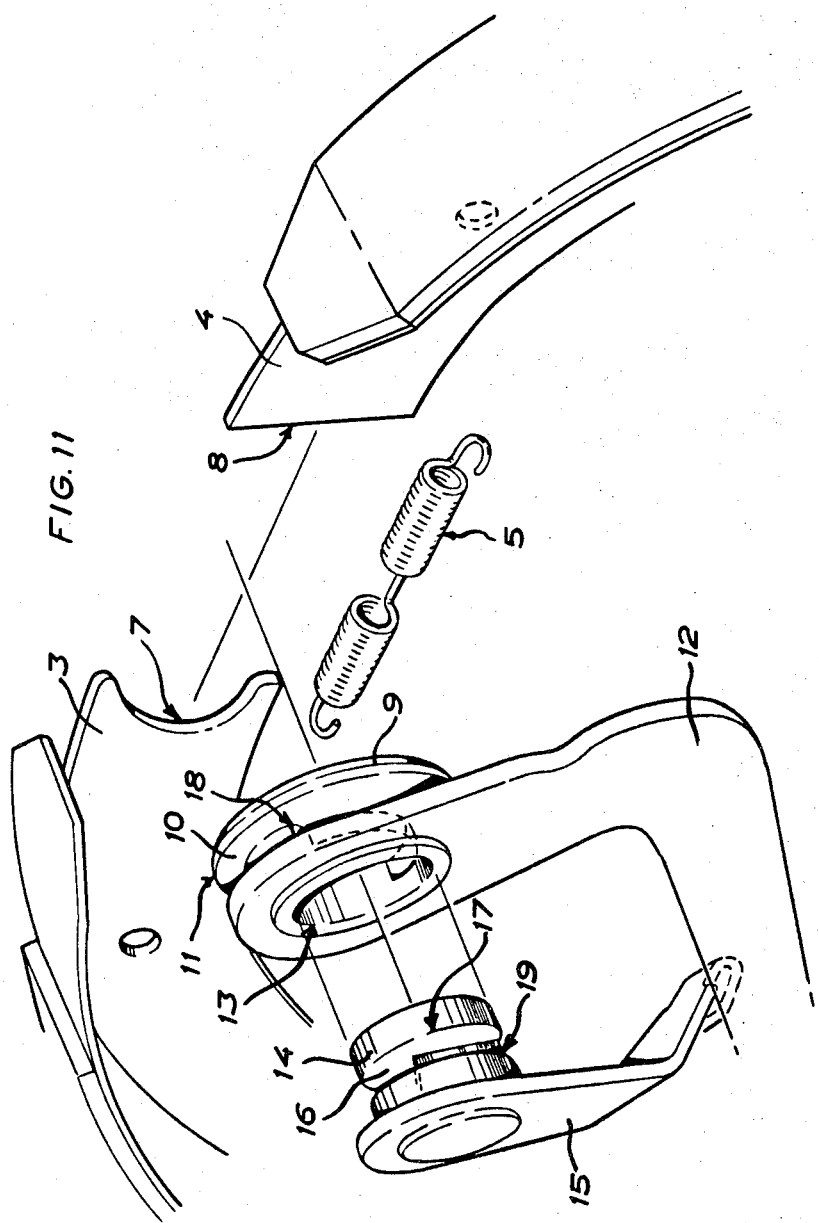

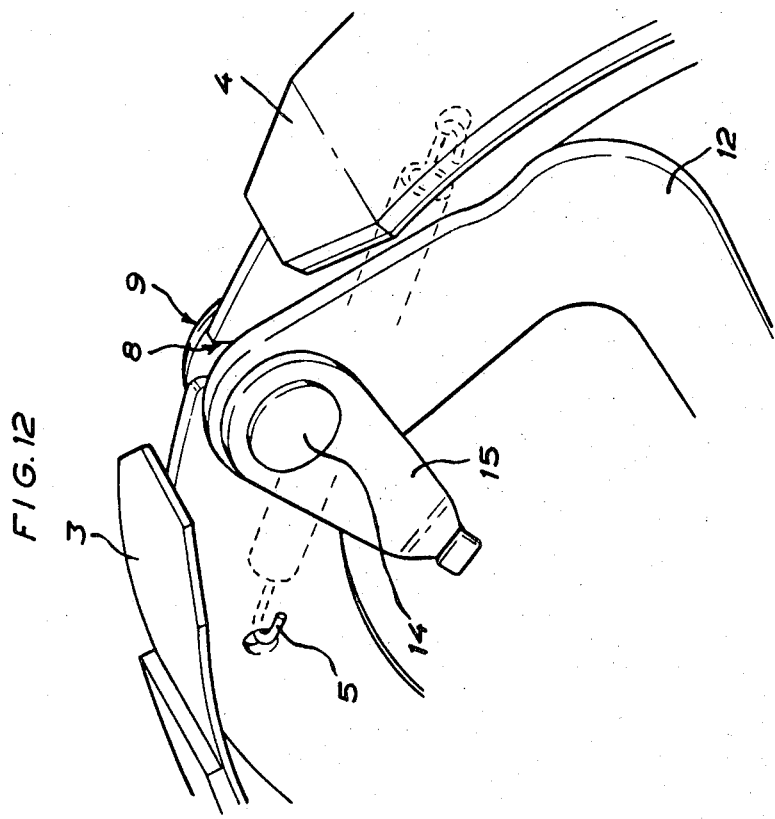

BRAKE OPERATING MECHANISMS

This invention relates to an operating mechanism for a drum brake, preferably of the simplex type, comprising a pair of brake shoes which are applied against an abutment which is stationary with respect to a brake shield and against an expanding means disposed between the ends of the brake shoes.

The present invention has for its object to provide a brake operating mechanism which has a minimum of movable parts and which can be mounted at the brake shoes without any complicated measures.

According to the invention, the expanding means is a body having an eccentric abutment surface and rotatable by means of a lever, said body being formed with a groove extending substantially all around it and having a sliding surface located in a substantially arcuate plane; the sliding surface and the groove edges laterally defining said surface are adapted to bear against an arcuate surface of a recess formed at the end portion of one brake shoe; the abutment surface disposed between the groove edges is adapted to engage a substantially transverse planar end surface of the other brake shoe which penetrates between the groove edges, the engagement between the sliding surface and the abutment surface, on one hand, and the arcuate surface of the brake shoe and the planar end surface, on the other hand, preventing radial displacement of the expanding body, while the engagement of the groove edges with the side surfaces of the end portions of the two brake shoes prevents both axial displacement of the expanding body and relative displacement of the end portions of the brake shoes.

An embodiment of the brake operating mechanism will be more fully described hereinbelow, reference being made to the accompanying drawings in which:

FIG. 1 is a view of the brake as viewed from the end of the wheel axle;

FIG. 2 is a side elevation of the brake on line A—A;

FIG. 3 is a view of the brake actuated by the outer expanding sleeve (brake operated in driving);

FIG. 4 is a view of the brake actuated by the inner expanding pin (parking brake);

FIGS. 5 and 6 are detail views of the outer expanding sleeve with its lever;

FIGS. 7 and 8 are detail views of the inner expanding pin with its lever;

FIG. 9 shows the right-hand brake;

FIG. 10 shows the left-hand brake;

FIG. 11 is an exploded view of the expanding means;

FIG. 12 is a view of the expanding means in assembled state.

FIG. 1 illustrates the construction principle of the brake operating mechanism. A brake shield 1 is non-rotatably connected to the wheel axle assembly. Mounted at the bottom of the brake shield 1 is an adjusting device 2 which upon braking simultaneously transmits the resulting braking power from the brake shoes 3 and 4 to the brake shield 1. The adjusting device also serves as abutment means for the lower ends of the brake shoes.

The brake shoes 3 and 4 are kept together by two return springs 5 and are held applied in axial direction against the brake shield 1 by springs 6. One brake shoe 3 at its upper end has a semicircular recess while the other brake shoe 4 at its upper end has a transverse planar surface 8.

Mounted between the brake shoes is the expanding means 9 which in the embodiment illustrated is in the form of a sleeve with a peripheral groove 10 into which the end portions of the brake shoes 3 and 4 are adapted to penetrate. The engagement between the groove edges 11 and said end portions prevents axial displacement of the expanding sleeve simultaneously as the ends of the brake shoes are fixed relative to each other in axial direction.

One half of the groove has a cylindrical bottom surface which conforms to the recess 7 of one brake shoe 3, constituting a sliding surface. As the bottom surface of the groove merges into a planar section that conforms to and is adapted to bear against the planar surface 8 of the other brake shoe 4, the expanding sleeve having a lever 12 will be fixed also in radial direction.

Formed in the expanding body or sleeve is an opening 13 which is concentric with the axis of rotation of said body or sleeve, and an expanding pin 14 is rotatably mounted in said opening to serve as a further expanding means. The expanding pin one end of which carries a lever 15 at its middle portion is formed with a slot-shaped, radially directed recess 16 with sides 17 and a bottom divided into two faces 20 at right angles to each other. One of said faces is adapted to bear against the middle portion of the transverse planar surface 8 of the other brake shoe 4. This is made possible in that the peripheral groove 10 of the expanding sleeve extends through the circumferential wall of the sleeve along that part thereof which lies beyond the portion of the groove having the peripherally extending bottom. The engagement between the sides or flanks 17 of the recess 16 and the lateral surfaces of the brake shoe 4 will hold the expanding pin against axial displacement.

The expanding sleeve 9 having the lever 12 is to be a component part of the brake system for slowing up or stopping the motion of the vehicle. The sleeve 9 is actuated for instance by a per se known electro magnet or like means, while the expanding pin 14 having the lever 15 is to be a component part of the parking brake system. The pin 14 is actuated from a hand-brake lever or the like for instance by means of a wire.

When braking is effected with the brake system for slowing up or stopping the motion of the vehicle, see FIG. 3, the following takes place:

The lever 12 is pulled in the direction of the arrow — i.e., inwardly towards the center of the brake shield 1 — the sleeve 9 turning about its center while the cam 18, formed by one of the two radially directed surfaces into which the bottom of the groove 10 merges, is pressed into application with the planar surface 8 of the other brake shoe 4. As a result, the brake shoes 3 and 4 are moved apart and pressed against the inner surface of the brake drum so that braking action is produced. The pin 14 in the interior of the sleeve 9 is not actuated when the brake for slowing up or stopping the motion of the vehicle is made operative.

Upon braking with the parking brake, see FIG. 4, the following takes place:

The lever 15 is pulled in the direction of the arrow — i.e., inwardly towards the centre of the brake shield 1 — the pin 14 turning in the opening 13 of the sleeve 9 while the cam 19, formed by the edge portion of one of the two bottom faces of the slot-shaped recess 16, is pressed into application with the planar surface 8 of the other brake shoe 4 so that, as mentioned above, the brake shoes are moved apart and braking action is produced.

As will appear from the drawing the bottom of the slot-shaped recess 16 has two surfaces 20 set in an angular relation to one another, and this makes it possible to employ one and the same detail irrespective of the positions in which the brake drums are arranged in the vehicle.

The following advantages are gained by the brake operating mechanism of the present invention:

The expanding device is fixed between the brake shoes radially by reason of the recess 7, and axially by the edges 11 of the groove 10. Separation of the brake shoes is effected by the cam 18. The opening 13 may be dispensed with in case no parking brake is necessary. The brake shield 1 does not require any support.

Should a parking brake be necessary the brake operating mechanism is supplemented with the opening 13 and the pin 14 which is simply fixed in the opening by its engagement with the brake shoe 4.

The illustrated embodiment of the pin 14 for the parking brake is advantageous in that it can be used for both right-hand and left-hand mounting.

Apart from its use in electrically actuated brakes, the brake operating mechanism according to the invention may be utilized also for instance in hydraulically, pneumatically and mechanically actuated brakes.

What I claim and desire to secure by Letters Patent is:

1. An operating mechanism for a drum brake, preferably of the simplex type, comprising a pair of brake shoes which are applied against an abutment which is stationary with respect to a backing plate and against an expanding means disposed between the ends of the brake shoes, wherein the expanding means is a body having an eccentric abutment surface and rotatable relatively to both of said brake shoes by means of a lever, said body which is independent of said backing plate being formed with a groove extending substantially all around it, part of a bottom of said groove forming a sliding surface located in a substantially arcuate plane; the sliding surface and the groove edges laterally defining said surface are adapted to bear against and engage an arcuate bottom surface of, and edge surfaces along a recess formed at the end portion of the one brake shoe; the abutment surface forming another part of the bottom of the groove and being disposed between the groove edges is adapted to bear against a substantially transverse planar end surface of the other brake shoe, inserted between and engaging the groove edges, the engagement between the sliding surface and the abutment surface, on one hand, and the arcuate surface of the one brake shoe and the planar end surface of the other brake shoe, on the other hand, preventing radial displacement of the expanding body, while the engagement of the groove edges with the side surfaces of the end portions of the two brake shoes prevents axial displacement of the expanding body and relative displacement of the end portions of the brake shoes.

2. A mechanism as claimed in claim 1, wherein the abutment surface is a portion of the bottom of said groove, which portion preferably extends along a chord of said rotatable body and constitutes a continuation of the sliding surface.

3. A mechanism as claimed in claim 1, wherein the body serving as an expanding means is formed with an opening which is concentric with the axis of rotation of the body, and is cutting through part of the groove of said body to leave of the part of the groove bottom, forming the abutment surface, only end portions, a rotatable pin forming a second expanding means, having a radial recess and being rotatable in the opening of the first expanding means body by means of a lever, a bottom portion of said radial recess forming an abutment surface, said abutment surface being adapted to engage the planar end surface of the other brake shoe, which reaches said abutment face by passing in between the groove sides of the body, the engagement between flanks defining the recess and the sides of the brake shoe end portion, respectively, adapted to prevent axial displacement of the pin relatively to the body.

* * * * *